United States Patent
Tucker et al.

(10) Patent No.: US 7,191,860 B2
(45) Date of Patent: Mar. 20, 2007

(54) APPARATUS FOR VEHICLE HOOD

(75) Inventors: Eric N. Tucker, Denton, TX (US); Joseph F. Marrs, Aubrey, TX (US)

(73) Assignee: Paccar Inc, Bellevue, WA (US)

( * ) Notice: Subject to any disclaimer, the term of this patent is extended or adjusted under 35 U.S.C. 154(b) by 244 days.

(21) Appl. No.: 11/084,569

(22) Filed: Mar. 18, 2005

(65) Prior Publication Data

US 2006/0207817 A1    Sep. 21, 2006

(51) Int. Cl.
B62D 25/12    (2006.01)

(52) U.S. Cl. ............................ 180/69.21; 292/DIG. 14; 292/338; 180/69.2

(58) Field of Classification Search ............. 180/69.21, 180/69.2; 292/DIG. 14, 338
See application file for complete search history.

(56) References Cited

U.S. PATENT DOCUMENTS

| | | | |
|---|---|---|---|
| 1,390,751 A * | 9/1921 | Bell ......................... 217/60 G |
| 1,598,868 A | 9/1926 | Lundelius | |
| 2,188,335 A | 1/1940 | Claud-Mantle | |
| 4,938,520 A | 7/1990 | Shelton | |
| 4,991,675 A * | 2/1991 | Tosconi et al. .......... 180/69.21 |
| 5,730,240 A | 3/1998 | Hoffman et al. | |
| 5,791,428 A | 8/1998 | Noll et al. | |
| 5,975,228 A | 11/1999 | Parfitt | |
| 6,213,235 B1 * | 4/2001 | Elhardt et al. ............. 180/69.2 |
| 6,453,511 B2 * | 9/2002 | Sato ........................... 16/360 |
| 6,609,583 B2 * | 8/2003 | Schillaci et al. ......... 180/69.21 |
| 6,892,843 B2 * | 5/2005 | Schillaci et al. ......... 180/69.21 |
| 6,934,999 B2 * | 8/2005 | Kreth et al. ................... 16/222 |
| 7,070,016 B1 * | 7/2006 | Tucker ..................... 180/69.21 |
| 2004/0182617 A1 * | 9/2004 | Sanderson ............... 180/69.21 |
| 2005/0179286 A1 * | 8/2005 | Adachi .................. 296/193.11 |
| 2006/0108169 A1 * | 5/2006 | Borg et al. .................. 180/274 |
| 2006/0207816 A1 * | 9/2006 | Marrs et al. ............. 180/69.21 |

* cited by examiner

*Primary Examiner*—Jeff Restifo
(74) *Attorney, Agent, or Firm*—Sidley Austin LLP

(57) ABSTRACT

A latching device and operating mechanism are provided suitable for controlling the opening or closing of a tilting cover such as the hood of a car or truck. The latching device operates to prevent accidental closure of the cover when the cover is open. The operating mechanism is coupled to the latching device for releasing the latching device when the hood is to be shut. The operating mechanism is located on the vehicle near a location from which an operator typically opens or closes the hood.

5 Claims, 3 Drawing Sheets

APPARATUS FOR VEHICLE HOOD

The present invention generally relates to an apparatus for controlling the opening or closing of a cover or hatch on a motor vehicle, and more particularly to an apparatus for conveniently controlling the opening or closing of a forward tilting hood of a medium- or heavy-duty truck or highway tractor.

BACKGROUND OF THE INVENTION

Forward tilting truck hoods are typically attached to the body or frame of a truck by means of one or more hinges, pins, or other types of revolute joint. Latches, hooks, rubber straps, and the like are used to keep the hood shut during normal operation. Prior to opening the hood, the latches or other fastener must be unfastened. Because these fasteners typically are located on either side of the hood opposite the hinge, the operator must move to various locations to operate the fasteners. For example, an operator may have to unfasten an elastic hold down on each side of the truck cab near a rear portion of the hood. Other fasteners may be operated remotely from in the cab by a cable, solenoid, or other mechanism.

After operating the latches or fasteners that hold the hood shut, the operator then typically moves to the front of the truck. From this position the top front portion of the hood may be pulled so that the hood rotates forward about the hinge pivot axis, giving the operator access to the engine and other vehicle components located under the hood.

The weight of the hood of a typical large truck may easily exceed 100 pounds. A hood may also have sharp angular edges, protruding bolts, and the like. Thus, an unrestrained truck hood presents a risk of injury should it fall open or shut in an uncontrolled manner. For example, an open hood may be blown shut unexpectedly by a sufficiently strong wind. To prevent such occurrences, a locking mechanism is typically provided to prevent inadvertent closure of a forward tilting truck hood.

When closing the hood an operator first must release the locking mechanism that prevents inadvertent hood closure. Typically, this requires the operator to move to a position beside the hood so that he may reach the locking mechanism. Often the locking mechanism is located under the hood in the vicinity of the hinge. Thus, while releasing the locking mechanism the operator may be in a position in which he is vulnerable if the hood were to shut accidentally.

After releasing the locking mechanism, the operator moves to the front of the truck and lifts the hood so that it rotates up and back about the hinge pivot axis. When the hood is fully shut, the operator then moves to various other locations around the truck to operate one or more latches or other devices that keep the hood securely shut.

Thus, an operator desiring to open or shut a typical forward tilting hood of a large truck has to move to several locations around the truck to operate various securing mechanisms, to release locking mechanisms, and to open or shut the hood. It would therefore be desirable to provide a mechanism that enables the operator to conveniently operate securing and locking mechanisms and reposition the hood from a single convenient position near the front of the truck.

SUMMARY OF THE INVENTION

The above, and other objects and advantages of the present invention are provided by an operating mechanism located near a top front portion of a truck hood. The operating mechanism may be coupled to a release mechanism so that actuation of the operating mechanism releases the hood so that it may be opened. The release mechanism may also be coupled to a locking mechanism that prevents the hood from closing inadvertently. Thus, an operator is able to operate the latching and locking mechanisms, and open or shut the hood, from a single location near the front of the truck.

BRIEF DESCRIPTION OF THE DRAWINGS

The above and other objects and advantages of the present invention will be understood upon consideration of the following detailed description taken in conjunction with the accompanying drawings, in which like reference characters refer to like parts throughout, and in which.

DETAILED DESCRIPTION

Figure 1:
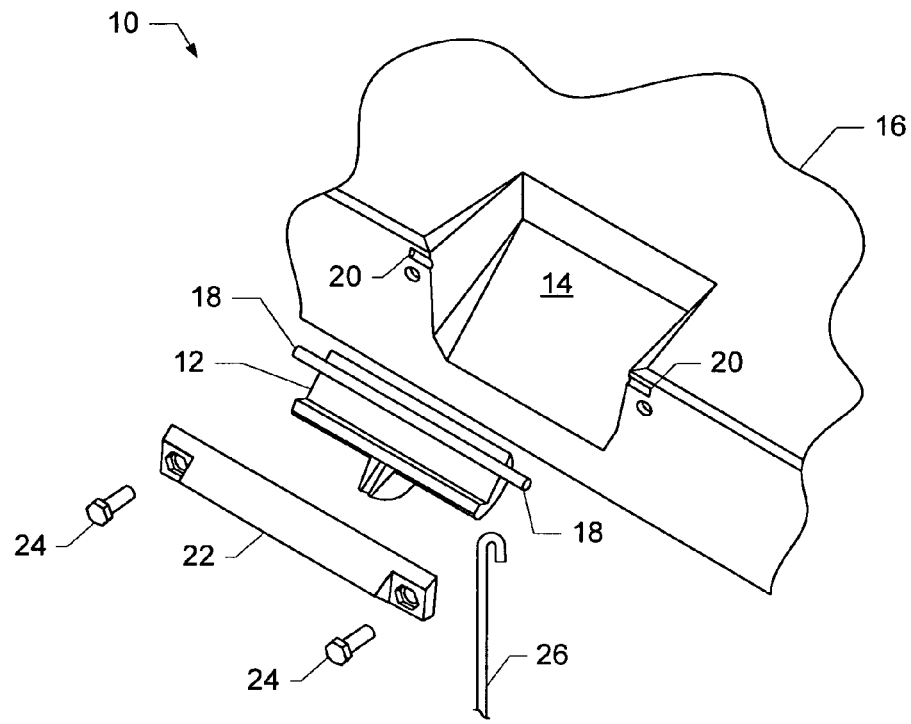
FIG. 1 is an oblique exploded view of an illustrative embodiment of an operating mechanism in accordance with the principles of the present invention.

Referring first to FIG. 1, operating mechanism 10 includes movable handle 12, disposed near hand recess 14 in hood 16. Preferably, hand recess 14 is located along a top front edge of hood 16 and has a suitable size and shape to permit entry of an operator's hand. Movable handle 12 includes pivots 18 extending from opposite ends thereof, which are configured to fit corresponding recesses 20 in hood 16.

Figures 2A, 2B:
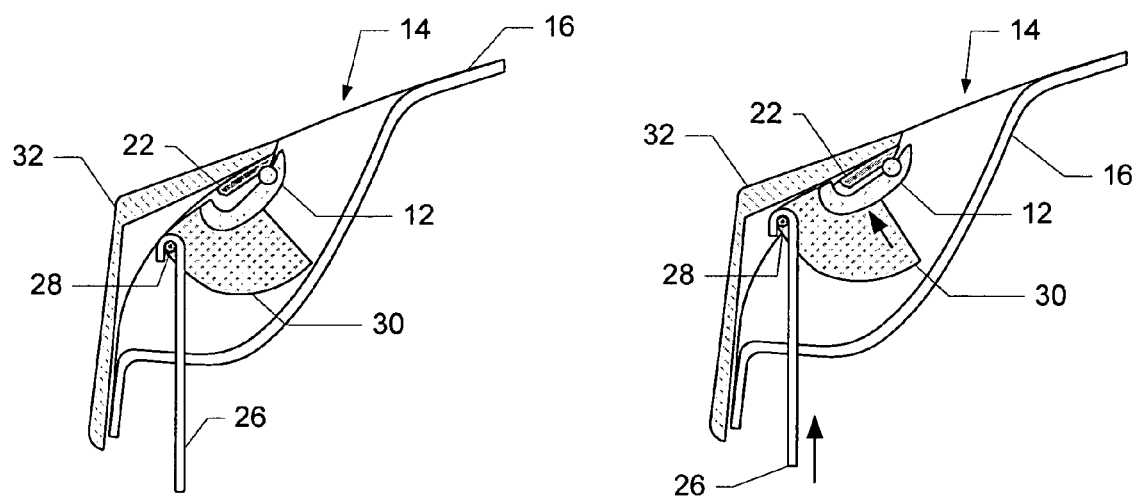
FIGS. 2A and 2B are two sectional views showing the operating mechanism of FIG. 1 in normal and actuated positions, respectively.

As shown in FIGS. 2A and 2B, link 26 is operatively coupled to movable handle 12 by means of pin 28. In the illustrative embodiment of the present invention, a cable or other type of operative interconnect may also be used. Shrouds or guards 30 extending from movable handle 12 on both sides of link 26 may be provided to prevent an operator's hand or fingers from being pinched during operation of operating mechanism 10.

As shown in FIG. 1, movable handle 12 including pivots 18, pin 28, and shroud 30, comprises a unitary structure preferably formed from injection molded plastic. Alternatively, movable handle 12 may comprise an assemblage of multiple parts.

Fixed handle 22 is disposed adjacent to movable handle 12 and is fastened to hood 16 using bolts 24, or other suitable means, so that pivots 18 are retained in recesses 20. An ornamental fascia such as grille work 32 of FIGS. 2A and 2B (not shown in FIG. 1) may be mounted to hood 16 so as to hide operating mechanism 10 from view.

When operating mechanism is not being used, the weight of link 26, the elastic resilience of pivots 18, a spring (not shown), or some other biasing means causes movable handle 12 to assume the position shown in FIG. 2A. To use operating mechanism 10, an operator grasps movable handle 12 and fixed handle 22, for example, by inserting their fingers into hand recess 14. Squeezing movable handle 12 toward fixed handle 22 causes movable handle 12 to rotate or pivot about pivots 18. As shown in FIG. 2B, this causes link 26 to be pulled upward by pin 28. Movement of link 26 may in turn operate a remote mechanism or device. For example, link 26 may be coupled to latching device 36 of FIG. 3. When an operator releases his movable handle 12, movable handle 12 returns to the position shown in FIG. 2A due to the biasing means described above.

The operating mechanism thus described in connection with FIGS. 1, 2A, and 2B provides a convenient device for operating remote mechanisms such as hood release mechanisms and the like. Although operating mechanism 10 is shown with a single mechanical linkage, other arrangements may be used. For example, multiple movable handles and linkages may be provided so that several remote mechanisms may be operated. In addition, movable handle 12 may operate a switch that in turn activates a relay, solenoid, or the like.

Figure 3:
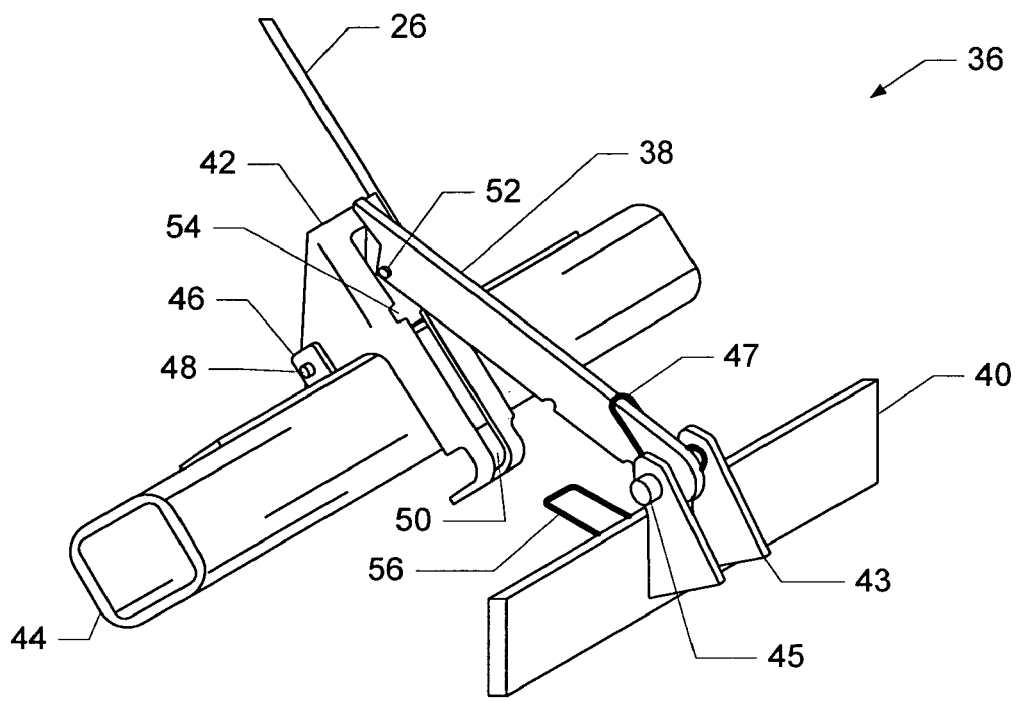
FIG. 3 is an oblique view of a locking device for preventing unintended closure of a forward tilting truck hood, in accordance with the principles of the present invention.

Turning now to FIG. 3 an oblique view is shown of latching device 36 which prevents inadvertent closure of a truck hood. Latching device 36 includes latch bar 38 pivotally coupled to vehicle frame cross member 40 and release lever 42 pivotally mounted to hood cross member 44. For example, latch bar 38 may be attached by pin 45 to bracket 43 which may be bolted or welded to vehicle frame cross member 40. Similarly, release lever 42 may be connected by pin 48 to bracket 46, which in turn is connected to hood cross member 44. Torsion spring 47 or other means biases latch bar 38 toward release lever 42 so that latch bar 38 fits into slot 50 therein. Pin 52 keeps latch bar 38 engaged within slot 50. Preferably, slot 50 includes portion 54 that is wide enough to permit pin 52 to pass through when latching device 36 is being assembled or disassembled. Strut 56 may be used to hold latch bar 38 in a released position to facilitate assembly of the hood to the vehicle.

Figure 4:
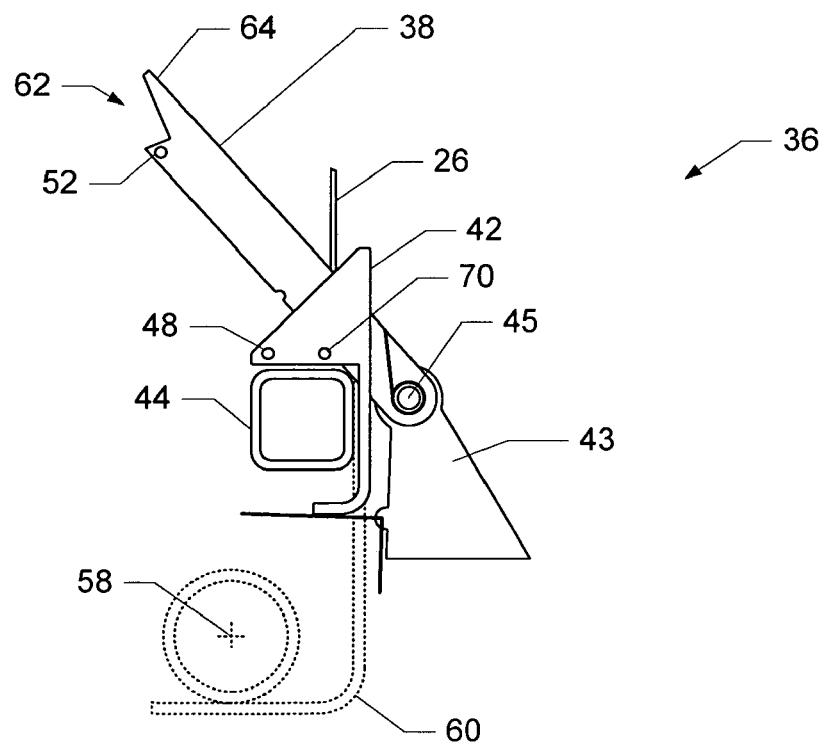
FIGS. 4 through 6 are sectional views of locking device of FIG. 3, shown at various stages of opening a truck hood.
Figure 5:
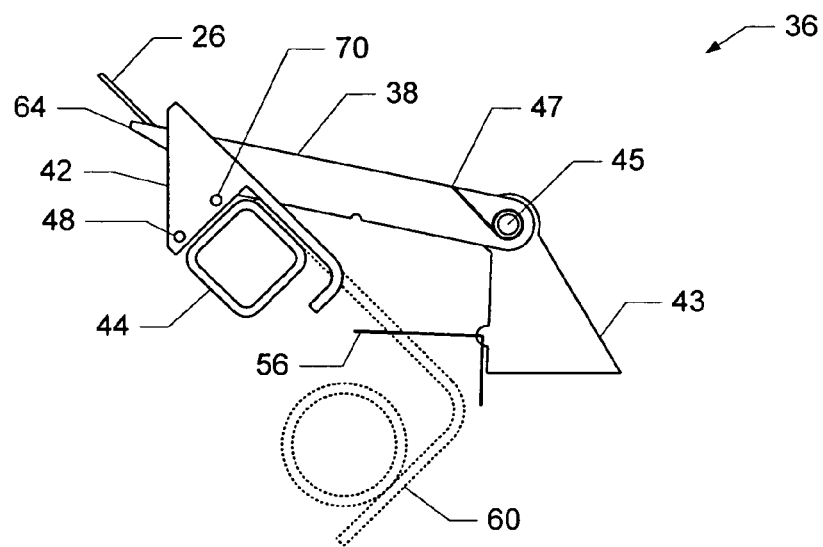
Figure 6:
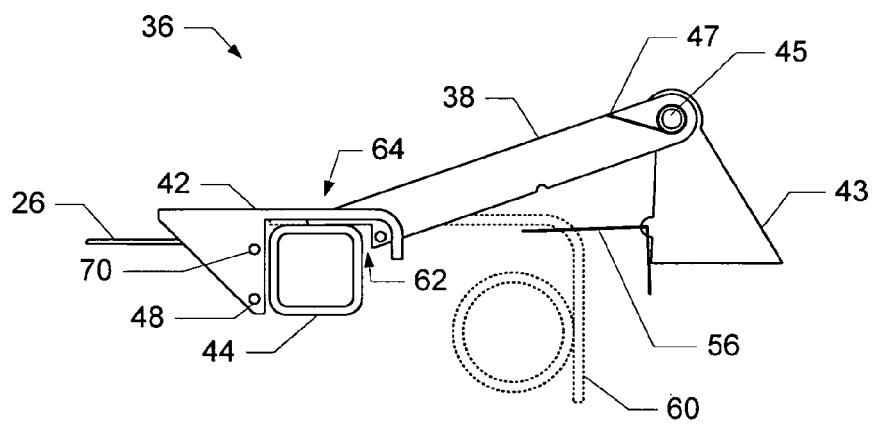

Operation of latching device 36 is now described in connection with FIGS. 4 through 6. FIG. 4 shows latching device 36 when the hood is in a fully shut position. In the shut position, latch bar 38 is biased against hood cross member 44. When the hood is pivoted open about pivot 58 of hinge 60 (shown in phantom) latch bar 38 slides in slot 50. As shown in FIG. 5, torsion spring 47 keeps latch bar 38 biased against hood cross member 44. As shown in FIG. 4, latch bar 38 includes notch 62 and projecting portion 64 in the free end thereof. When the hood is nearly fully open, hood cross member 44 slides under latch bar 38 into notch 62 as shown in FIG. 6. Projecting portion 64 of latch bar 38 comes to rest on an upper portion of hood cross member 44.

With hood cross member 44 positioned in notch 62, accidental closure of the hood is substantially prevented. If the hood is moved toward a closed position, either manually or due to a gust of wind or the like, a corner of hood cross member 44 contacts latch bar 38 at notch 62. Contact with latch bar 38 hinders further closing of the hood. Preferably, the relative positions of latch bar 38 and hood cross member 44, and the shape of notch 62 are designed so that any force of hood cross member 44 applied to notch 62 in latch bar 38 results in a small tangential force tending to further seat latch bar 38 against hood cross member 44. Hood cross member 44 may include suitable reinforcement to withstand forces and wear caused by contact with notch 62 in latch bar 38.

Figure 7:
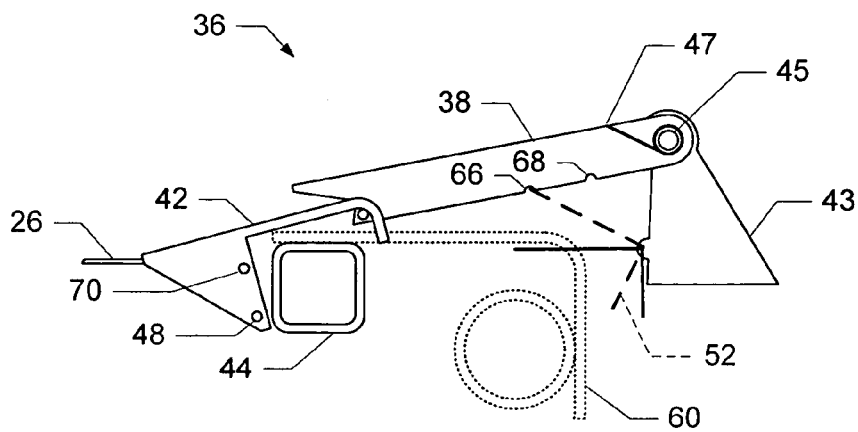
FIG. 7 is shows an alternative method of unlocking the locking device of FIG. 3.

The release of latching device 36 is shown in FIG. 7. Link 26 is pivotally connected to release lever 42 by pin 70, or other suitable means. When operated by a suitable mechanism, e.g., operating mechanism 10 of FIG. 1, link 26 causes release lever 42 to pivot on pin 48 to the position shown. An end of slot 50 contacts and lifts latch bar 38 so that notch 62 is clear of hood cross member 44. With latch bar 38 in this raised position, the hood can then be closed.

Strut 56 provides an alternative means of releasing latch bar 38 if, for some reason, it is not possible to operate link 26. For example, a vehicle may be parked such that access to operating mechanism 10 on the open hood is obstructed by another truck or other object. To release latching device 36, latch bar 38 is lifted so that hood cross member 44 is clear of notch 62. Strut 56 is then rotated upward and positioned so that an end of strut 56 fits into notch 66 in the lower edge of latch bar 38 as shown in phantom lines in FIG. 7. Strut 56 prevents torsion spring 47 from forcing latch bar 38 back down against hood cross member 44, and thereby permits the hood to be moved to the shut position. When the hood is being shut, an upper portion of hood cross member 44 comes into contact with the lower edge of latch bar 38, lifting it upward. The upward motion of latch bar 38 releases strut 56 from notch 66, and strut 56 returns to its reset position as shown in FIG. 4. Additional notches may be provided in the lower edge of latch bar 38 to hold latch bar 38 in other positions. For example, notch 68 may be provided that holds latch bar 38 in a near vertical orientation so that it is out of the way while the hood is being mounted to the vehicle.

Thus, a latching device and remote operating mechanism particularly suited for use in opening or closing a forward tilting hood of a motor vehicle has been disclosed. It will be readily apparent that the mechanisms thus disclosed may be useful for other applications and that various modifications may be made to the disclosed embodiment without departing from the spirit and scope of the invention. Accordingly, one will understand that the description provided herein is provided for purposes of illustration and not of limitation, and that the invention is limited only by the appended claims.

What is claimed is:

1. An apparatus for preventing unintended closure of a tilting cover pivotally coupled to a base, the apparatus comprising:

a release lever pivotally coupled to the tilting cover, the release lever including a portion extending substantially parallel to an axis about which the release lever pivots;

a latch bar having a first portion pivotally coupled to the base and a second portion adapted to engage the tilting cover;

a handle pivotally coupled to the tilting cover; and a linkage interconnected between the handle and the release lever, wherein the latch bar is configured so that the second portion engages the cover when the tilting cover is tilted to an open position thereby interfering with closure of the tilting cover, and the handle, linkage and release lever are configured so that when the handle is operated, the extending portion of the release lever lifts the latch bar so that the second portion thereof is no longer engaged with the cover.

2. The apparatus of claim 1, further comprising a biasing member that biases the latch bar so as to pivot toward the tilting cover.

3. The apparatus of claim 1, wherein the tilting cover comprises a tilting hood of a motor vehicle.

4. The apparatus of claim 1, wherein the release lever and latch bar are disposed near a pivot axis of the tilting cover, and the handle is disposed in a location of the tilting cover spaced apart from the pivot axis of the tilting cover.

5. The apparatus of claim 1 wherein the handle is disposed on the tilting cover near an operating position of a user opening the tilting cover.

\* \* \* \* \*